UNITED STATES PATENT OFFICE 2,525,015

METHINE DYESTUFFS

Jules Edmond Beersmans, Antwerp-Borgerhout, Belgium, assignor to Gevaert Photo-Producten N. V., Mortsel-Antwerp, Belgium, a company of Belgium No Drawing. Application June 10, 1947, Serial No. 753,818. In Great Britain June 17, 1946

3 Claims. (Cl. 260—240.6)

This invention relates to methine or polymethine dyestuffs.

It is an object of this invention to provide a new class of methine or polymethine dyestuffs.

To accomplish this object and others which will hereinafter appear, my invention resides in the new product which is more particularly described in the following specification and sought to be defined in the appended claims.

I have found a new class of methine or polymethine dyestuffs which contain, at least at one side of the central methine group or polymethine chain, a 1,2,4-oxodiazole nucleus and an electronegative group linked to the same C atom, this electronegative group being e. g. cyan,

anion, and a group of the formula —CA—R$_1$ wherein A is O or S and R$_1$ is alkyl, substituted alkyl, alkoxy, carbalkoxy, aryl, substituted aryl, an amino or substituted amino group.

More particularly, I have found a new class of methine or polymethine dyestuffs which may be represented by the following general formula

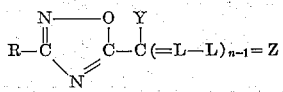

wherein R is alkyl, substituted alkyl, aryl or substituted aryl; Y is an electronegative group, such as cyan,

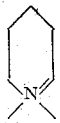

anion, and a group of the formula —CA—R$_1$ wherein A is O or S and R$_1$ is alkyl, substituted alkyl, alkoxy, carbalkoxy, aryl, substituted aryl, an amino or substituted amino group; $n$ is a positive integer; L is a methine group either substituted or not; Z is any of the following:

(1)

wherein X and D are substituents which when linked to a methylene group X—CH$_2$—D activate the same, X may be an electronegative group whereas D represents a heterocyclic nucleus, for example, oxodiazole or benzothiazole, or X may, for example, be a carbonyl group linked to D in such a way that X and D form part of a heterocyclic five or six membered ring, such as a pyrazolone, rhodanine, thiohydantoine, barbituric acid or a thiobarbituric acid ring;

(2) $\qquad$ =CH—NR'—aryl wherein R' is H or alkyl; or (3)
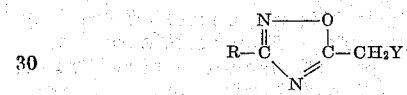

wherein R" is alkyl either substituted or not, $m$ is 1 or 2, E is the non-metallic atoms required for completing a N-containing heterocyclic ring as used in the chemistry of the cyanines. This ring may, for example, be thiazoline, oxazole, selenazole, benzoxazole, benzothiazole, naphtoxazole, quinoline, thiodiazole, the same substituted, etc., L is the same as above.

Many of the new dyestuffs have a good sensitizing action upon photographic silver halide emulsions.

The dyestuffs are prepared from the bases

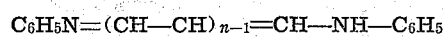

obtainable according to the general methods described in "Berichte" 18 (1885), 1053–1086, and 22 (1889), 2412–2459.

These products are reacted, for instance, with compounds of the general formula $$C_6H_5N=(CH—CH)_{n-1}=CH—NH—C_6H_5$$

or their hydrochlorides.

The reaction may be carried out in such a way that only 1 mol of these compounds reacts with 1 mol of an oxodiazole base to obtain products of the formula

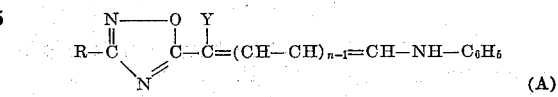

(A)

Since these products react upon reactive methylene groups in general, dyestuffs may thereby be prepared, for example, corresponding to the formulae $$R-C\underset{N}{\overset{N-O}{\|}}C-C=(L-L)_{n-1}=L-CH-C\underset{N}{\overset{Y'\ O-N}{\|}}C-R' \quad (B)$$

These may be symmetrical or asymmetrical dyestuffs. For example, Y may be different or identical with Y', also R and R' may be identical or different or $$R-C\underset{N}{\overset{N-O}{\|}}C-C=(L-L)_{n-1}=L-CH(X)D \quad (C)$$

or $$R-C\underset{N}{\overset{N-O}{\|}}C-C=(CH-CH)_{n-1}=C-(L-L)_{m-1}-N-R'' \quad (D)$$

wherein the symbols used have the meanings indicated above.

The symmetric dyestuffs represented by the Formula B may also be obtained in one step without isolating the intermediate products A by the use of an excess of oxodiazole base. They can also be prepared by means of compounds of the types $$C_2H_5O-(CH=CH)_{n-1}-CH(OC_2H_5)_2$$

The dyestuffs represented by the Formula C may also be prepared by condensation of hemioxonoles with the oxodiazole bases.

The dyestuffs represented by the Formula D, too, may be obtained by condensation with the oxodiazole bases of quaternary cyclammonium salts which have a reactive group such, as for example, a halogen, alkylmercapto, arylamino or acylarylamino group in alpha position or gamma position with respect to the nitrogen atom, optionally at the end of a polymethine chain. They may also be prepared by treating a mixture of an oxodiazole base and a quaternary cyclammonium salt with an orthoester. Thus, a mixture of dyestuffs is obtained which owing to the great difference in solubility can be separated in a simple way.

Lower aliphatic alcohols, pyridine, the anhydrides of lower fatty acids, for example, acetic acid anhydride, are suitable reaction media for all of these condensations.

In most cases acid-binding condensing agents are added, for example, sodium acetate, or also strong bases such as triethylamine or piperidine.

The oxodiazole-polymethine dyestuffs are very stable. They are suitable for sensitizing silver halide emulsions and when mixed with other sensitizers, make possible very favorable effects. By suitable substitution in one or another part of the molecule, their properties or diffusion or solubility can be adapted to predetermined purposes, for example, for use as filter or anti-halation layers.

My new compounds can also be used for dyeing fabrics and other materials.

Some specific examples illustrating my invention are given hereinafter.

*Example 1*

8.25 g. 3-(p-tolyl)-5-acetonyl-1:2:4:-oxodiazole are melted whilst stirring with 15 g. diphenyl-formamidine at 135° C. on an oil bath. After cooling and crystallizing from alcohol, fine white crystals are obtained.

Melting point 161–162° C. Probable structure according to the following formula

Analysis:
Calculated: 13.16% N
Found:  13.12% N   }Dumas
        13.13% N

*Example 2*

1 g. 3-(p-tolyl)-5-(β-anilido-α-acetyl-vinyl)-1:2:4-oxodiazole and 0.8 g. 2-methyl-benzothiazole-ethyl-bromide in 15 cm.³ alcohol are boiled for 15 minutes with 0.43 cm.³ triethylamine. After cooling, filtering, thereby using a filter pump, and recrystallizing from alcohol, orange-red crystals are obtained.

Melting point 200°–201° C. Probable structure according to the following formula The dyestuff has a strong sensitizing action upon silver halide emulsions with a maximum at 520 mμ and reaching to 550 mμ.

The same product can also be formed by reaction of 2-β-anilido-vinyl-benzothiazole-ethiodide upon 3-(p-tolyl)-5-acetonyl-1:2:4-oxodiazole.

*Analysis.*—Calculated: 7.94% S. Found: 8.01% S; 7.92% S.

*Example 3*

1.5 g. 3-(p-carbethoxybenzyl)-5-cyanmethyl-1:2:4-oxodiazole are boiled in alcohol with 0.5 cm.³ triethylamine, 0.5 cm.³ acetic anhydride and 2.25 g. 2-β-(analidovinyl)-benzothiazole-ethiodide for 15 minutes. After cooling, filtering and recrystallizing from alcohol, beautiful yellowish crystals are obtained.

Melting point 196° C. Probable structure according to the following formula

This dyestuff sensitizes silver halide emulsions with a maximum at about 510 mμ.

*Example 4*

1.44 g. 2-β-anilidovinyl-5-methyl-1:3:4 thiodiazole-benzylbromide with 1 g. 3-(p-tolyl)-5-cyanmethyl-1:2:4-oxodiazole in 10 cm.³ alcohol and 0.5 cm.³ acetic anhydride are boiled for five minutes, while 0.7 cm.³ triethylamine dissolved in alcohol are added drop by drop. After cooling, filtering, washing with water and alcohol and recrystallizing from alcohol, a product melting at 223.5°–224.5° C. is obtained. The probable structure is according to the following formula This dyestuff sensitizes a silver chloride emulsion with a maximum at 490 mμ.

Example 5

2.25 g. 2-β-anilidovinyl-benzoxazole-p-carboxy-benzyl-bromide and 1.08 g. 3-(p-tolyl)-5-acetonyl-1:2:4-oxodiazole in 15 cm.³ pyridine with 0.7 cm.³ acetic anhydride are heated for one hour on a boiling water bath. The reaction product is filtered and six times digested with alcohol, dissolved in a mixture of alcohol and water with an excess of an aqueous sodium bicarbonate solution, precipitated with hydrochloric acid whilst mechanically stirring, filtered and washed with water and alcohol. The probable structure is according to the following formula

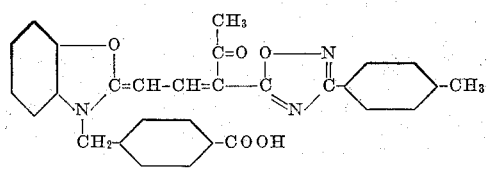

This dyestuff sensitizes a silver chloride emulsion with a maximum at 480 mμ.

Example 6

1.1 g. 3-(o-methoxy-phenyl)-5-acetonyl-1:2:4-oxodiazole with 1.93 g. 2-anilidovinyl-benzothiazole-ethiodide in anhydrous alcohol are boiled for 15 minutes with 0.48 cm.³ acetic anhydride and 0.65 cm.³ triethylamine. After crystallizing from alcohol, a product is obtained which melts at 195°–196° C. The probable structure is according to the following formula

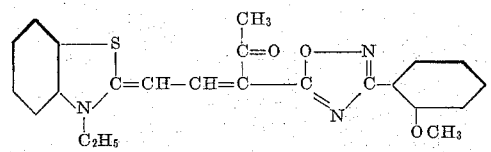

This dyestuff sensitizes very strongly silver halide emulsions with a broad maximum at about 510 mμ.

Example 7

1 g. 3-(p-tolyl)-5-cyanmethyl-1-2-4-oxodiazole and 1.29 g. β-anilido-acroleinanil-hydrochloride are kept for 7 hours at room temperature in alcohol with 1 mol triethylamine. A product is obtained which melts at 196°–198° C. with decomposition. The probable structure is according to the following formula

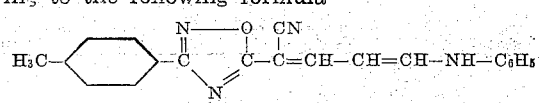

This product forms yellow crystals.

Example 8

1.09 g. of the product obtained in Example 7 with 0.66 g. 3-(p-tolyl)-5-cyanmethyl-1:2:4-oxodiazole are heated for 7 hours at 40°–50° C. in a mixture of alcohol and pyridine with 1.32 cm.³ of piperidine. The reaction product is precipitated with water and recrystallized from alcohol.

Melting point at 180°–190° C. with decomposition. Probable structure according to the following formula

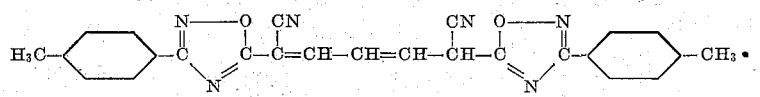

This intense pink dyestuff sensitizes strongly a silver bromo-iodide emulsion with a maximum at 545 mμ.

Example 9

6.48 g. 3-(p-tolyl)-5-acetonyl-1:2:4-oxodiazole are dissolved in 50 cm.³ anhydrous alcohol at 50° C. 8.52 glutacondialdehyde-dianilhydrochloride, 4.2 cm.³ triethylamine and 15 cm.³ alcohol are added. The mixture is stirred and kept for 20 hours at room temperature. After recrystallization, beautiful sheets with metal gloss melting at 165° C. are obtained. This product gives a pink solution in alcohol. The probable structure is according to the following formula

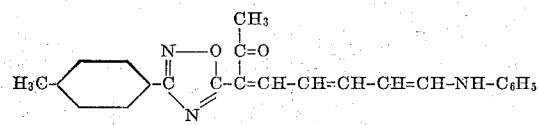

Example 10

10 cm.³ of an alcoholic solution of 3.24 g. 3-(p-tolyl)-5-acetonyl-1:2:4-oxodiazole and 2.84 g. glutacon-dialdehyde-dianil-hydrochloride are refluxed for 10 minutes with 1.4 cm.³ triethylamine. After recrystallizing from alcohol, an intense blue dyestuff is obtained. Probable structure according to the following formula

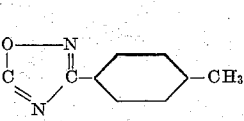

Melting point 156°–158° C.

Example 11

0.59 g. 3-(p-tolyl)-5-(6'-anilido-1'-cyan-1':3':5'-hexatrienyl)-1:2:4-oxodiazole and 0.33 g. 3-(p-tolyl)-5-cyanmethyl-1:2:4-oxodiazole are dissolved in 10 cm.³ of a mixture of pyridine and alcohol at about 50° C. 0.61 cm.³ of piperidine are added and the solution is kept for 4 hours at room temperature and for 1½ hours at 40°–50° C. the product is filtered while yet warm, and recrystallized from alcohol. An intense blue dyestuff melting at 178°–180° is obtained. The probable structure is according to the following formula

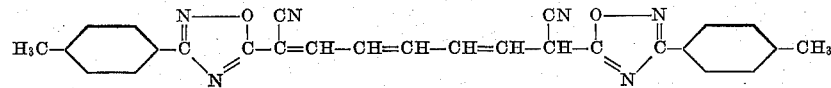

This dyestuff sensitizes strongly a silver bromo-iodide emulsion between 520 and 720 mμ.

3 - tolyl - 5 - (6'anilido - 1' - cyan - 1':3':5'-hexatrienyl) -1:2:4-oxodiazole was prepared in the manner described in Example 9; it melts at 184° C.

Example 12

1.19 g. of 2-(4'-acetanilido-1'-3'-butadienyl)-benzothiazole-ethiodide and 0.5 g. (3-p-tolyl)-5-cyanmethyl-1:2:4-oxodiazole are boiled in 5 cm.³ alcohol. 0.35 cm.³ triethylamine dissolved in 2.5 cm.³ alcohol are added drop by drop. The solution is boiled for five minutes. After cooling, filtering, washing with water and alcohol, recrystallizing from alcohol and from CHCl₃, a product melting at 239°–240° C. is obtained. Probable structure according to the following formula

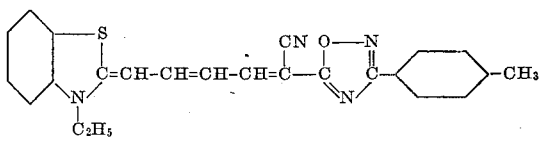

This dyestuff sensitizes a silver halide emulsion with a broad maximum at 610 mμ.

This dyestuff is also obtained by reacting 3-(p-tolyl) - 5 - (4' - anilido - 1' - cyan - 1' - 3' - butadienyl) -1:2:4-oxodiazole with 2-methyl-benzothiazole-ethiodide in acetic anhydride with triethylamine.

Example 13

2.04 g. 2-anilido-vinyl-benzothiazole-ethiodide and 1.6 g. 3-(p-tolyl)-1:2:4-oxodiazolyl-5-methyl-pyridinium chloride are dissolved in absolute alcohol. 0.7 cm.³ triethylamine and 0.5 cm.³ acetic acid anhydride are added. The mixture is boiled for 5 minutes. The precipitated product is filtered, washed with water and recrystallized from alcohol. Red crystals decomposing at 240° C. are obtained. Probable structure according to the following formula

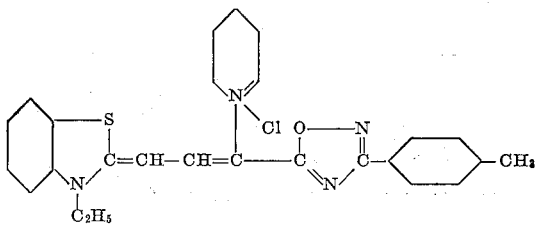

This dyestuff sensitizes a silver chloride emulsion with a maximum at 510 mμ.

Example 14

11.6 g. 2-anilido-vinyl-benzothiazole-ethiodide and 7 g. 3-(p-tolyl)-1:2:4-oxodiazolyl-5-acetic acid ethylester are dissolved in absolute alcohol. 4 cm.³ triethylamine and 3 cm.³ acetic acid anhydride are added. The mixture is boiled for 5 minutes. After cooling the precipitated product is filtered and recrystallized from alcohol. A yellow dyestuff melting at 174°–176° C. is obtained. Probable structure according to the following formula

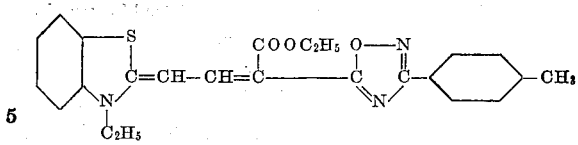

It is believed that my invention, as well as the advantages thereof, will be apparent from the foregoing detailed description. It will also be apparent that while I have shown and described preferred examples of my invention, changes may be made without departing from the spirit of the invention, as sought to be defined in the following claims.

I claim:

1. A dyestuff corresponding to the general formula:

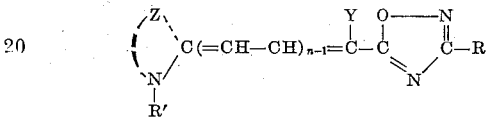

wherein Z represents the non-metallic atoms necessary to complete a member selected from the group consisting of five-membered heterocyclic rings and five-membered heterocyclic rings bearing a fused-on arylene group, Y represents a member selected from the group consisting of CN and acetyl, R represents a member selected from the group consisting of aryl and aralkyl, R' represents a member selected from the group consisting of alkyl and aralkyl, and $n$ represents a positive integer of from 2 to 3.

2. A dyestuff corresponding to formula

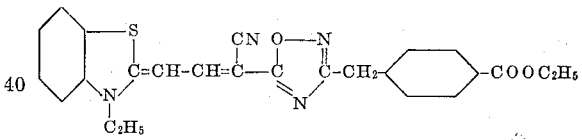

3. A dyestuff corresponding to formula

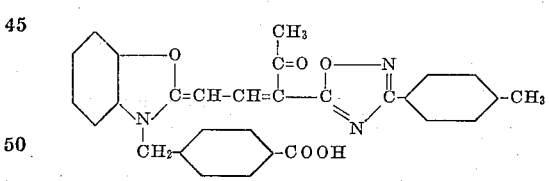

JULES EDMOND BEERSMANS.

REFERENCES CITED

The following references are of record in the file of this patent:

UNITED STATES PATENTS

| Number | Name | Date |
|---|---|---|
| 2,153,169 | Brooker | Apr. 4, 1939 |
| 2,185,798 | Steven | Jan. 2, 1940 |
| 2,191,810 | Stevens | Feb. 27, 1940 |
| 2,226,156 | Brooker | Dec. 24, 1940 |
| 2,312,068 | Bauer | Feb. 23, 1943 |
| 2,345,094 | Brooker | Mar. 28, 1944 |
| 2,393,745 | Brooker | Jan. 29, 1946 |
| 2,415,927 | Anish | Feb. 18, 1947 |